Jan. 20, 1970  K. KOSS  3,490,605
TRAVELING BEAM FOR THE PRODUCTION OF BRIDGE SECTIONS
Filed April 22, 1968  11 Sheets-Sheet 1
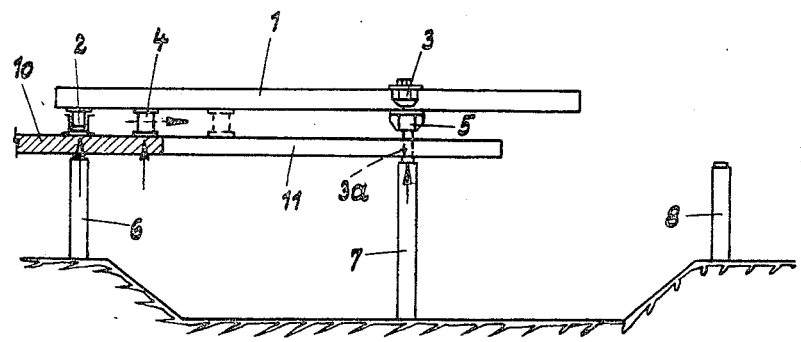
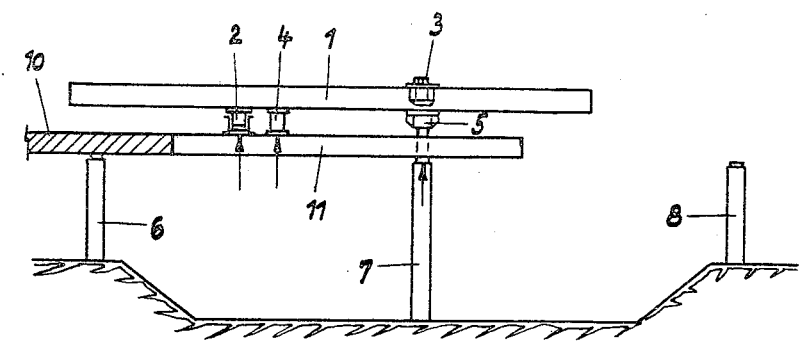
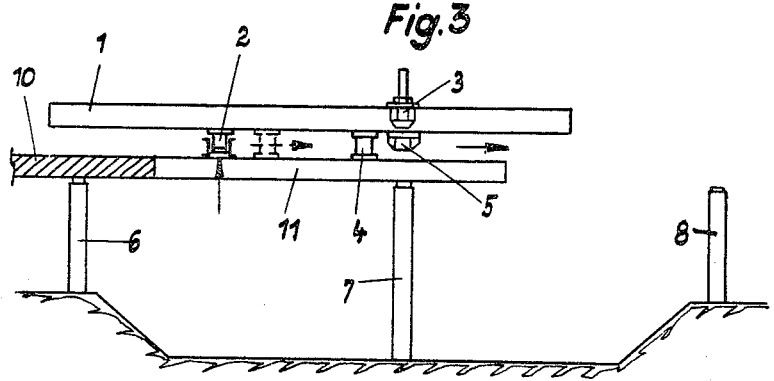
KURT KOSS
INVENTOR
Karl G. Ross
Attorney

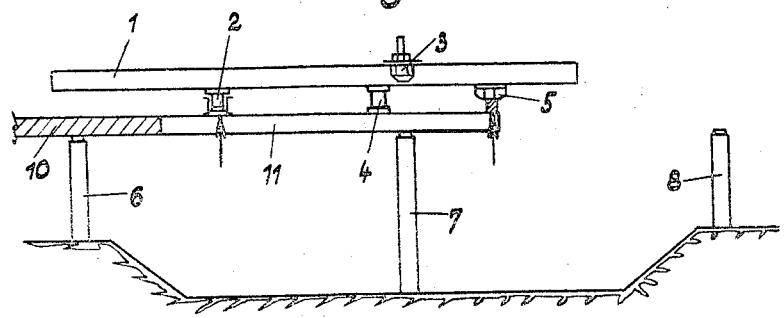
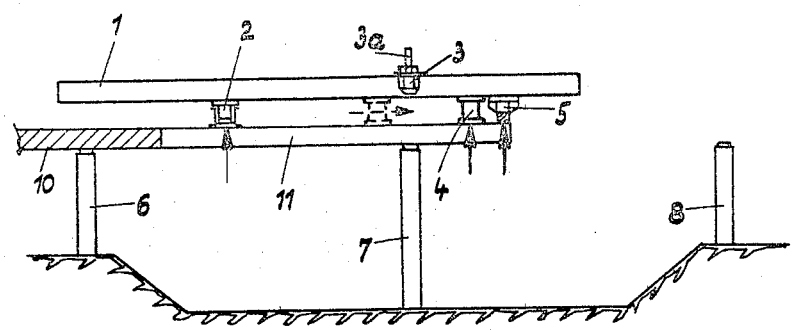
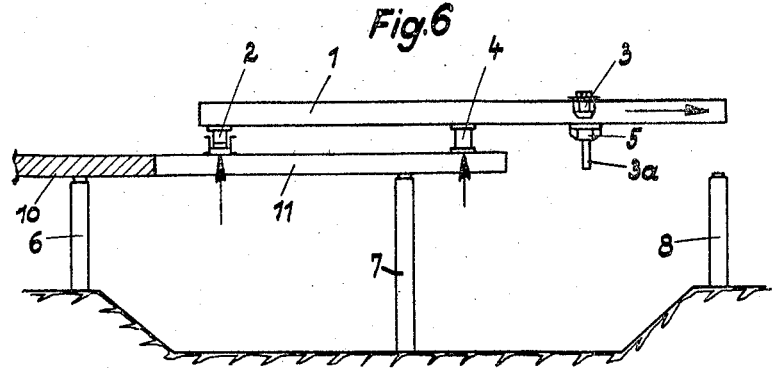

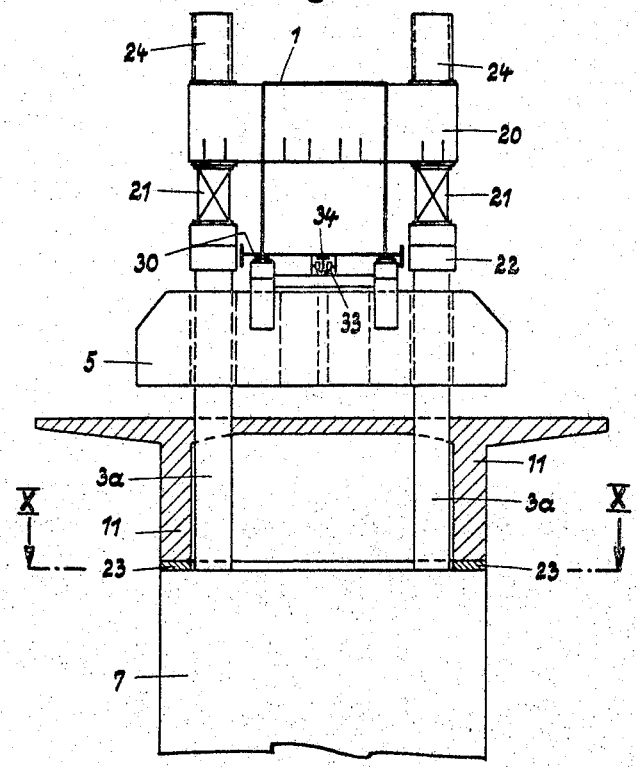
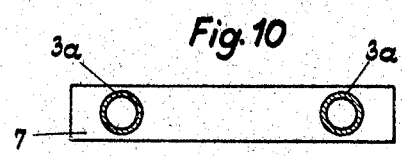

Jan. 20, 1970     K. KOSS     3,490,605
TRAVELING BEAM FOR THE PRODUCTION OF BRIDGE SECTIONS
Filed April 22, 1968     11 Sheets-Sheet 5

KURT KOSS
INVENTOR
Karl G. 
Attorney

Jan. 20, 1970 K. KOSS 3,490,605
TRAVELING BEAM FOR THE PRODUCTION OF BRIDGE SECTIONS
Filed April 22, 1968 11 Sheets-Sheet 8

KURT KOSS
INVENTOR

Karl F. Ross
Attorney

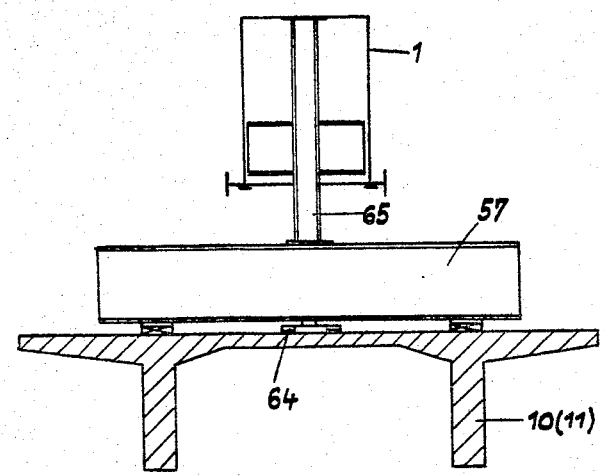
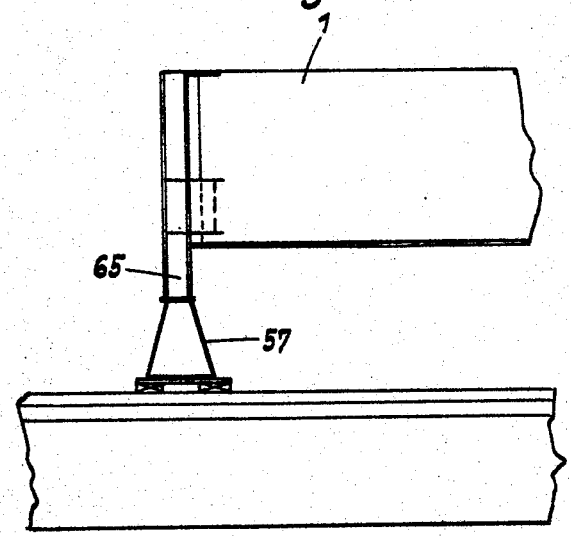

United States Patent Office 3,490,605
Patented Jan. 20, 1970

3,490,605
TRAVELING BEAM FOR THE PRODUCTION
OF BRIDGE SECTIONS
Kurt Koss, 7 Sebastianplatz, 1030 Vienna, Austria
Filed Apr. 22, 1968, Ser. No. 722,992
Claims priority, application Austria, Apr. 24, 1967,
3,872/67
Int. Cl. B66c 19/00
U.S. Cl. 212—1                              10 Claims

ABSTRACT OF THE DISCLOSURE

A traveling-beam assembly for the production of bridge sections and similar structures between previously erected supports, i.e. piers, with a main girder wherein two roller jacks, the effective height of which are adjustable even under load, are suspended on the main girder or beam and can be moved therealong so that the main girder can be advanced on each of these roller jacks in its longitudinal direction but also turned about the vertical axis passing through one of the roller jacks. A middle support attached to the main girder between its ends has downwardly acting pressure arrangements which allow the setting down of the main girder through support members on the previous constructional work; the support members are releasable from the presure arrangement. A support jack is movable on the main girder and fixable in a selected position of the latter, gives lateral guidance to the support members, and finally permits securing them in selected positions. The support jack, together with the support members released from the pressure arrangement, is movable along the main girder.

Figure 7:
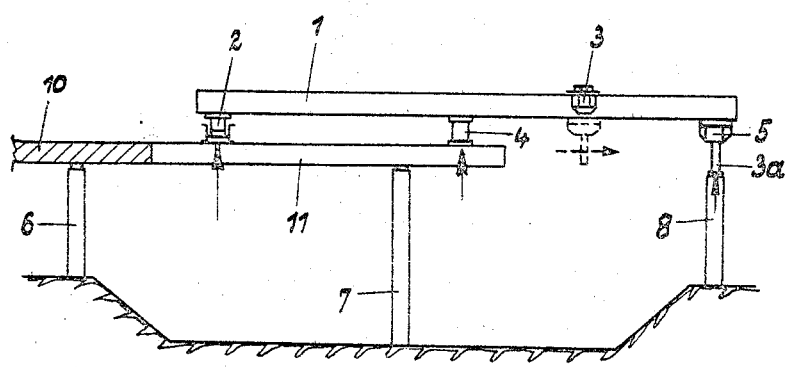

The invention relates to a traveling beam for the production of bridge sections, particularly of concrete bridges and in this case for the fixing of the formwork during concreting of bridge sections and similar structures between previously erected supports, particularly piers, or for use as erection bridge for the transfer of prefabricated bridge elements or for use as erection element in bridge building processes in which prefabricated elements are used in combination with concreting in the formwork. The invention aims at so designing a beam of this kind that it is remarkable for manifold application and simplicity of use, wherein it is particularly intended to make the usability of the erection beam, as regards its employment for the production of bridge roadways, largely independent of the form of pier and of the selected cross-sectional profile of the bridge section, and also to facilitate the advancement of the girder after finishing a bridge section by the omission of additional support arrangements on the piers and to simplify the control of the advancement operation by accommodation to the curved parts of the bridge and the like.

Traveling erection constructions for the production of sections particularly of bridge roadways have been made known in various forms. Constructions are known in which beams, which have a length of more than twice the pier spacing, can be advanced over their own roller jacks, which are mounted on the piers, wherein two of these rolling devices are always under load. In these constructions, the formwork beams run below the bridge-supporting structure to be concreted and the concreting formwork lies on these beams. Against this method of construction, there is the objection that during the advancement of the beams into the next section the formwork must be dismantled for the most part which is time-consuming; in addition, the traversing of curves makes great difficulties. A construction is also known in which a traveling beam and a formwork beam, or a pair of traveling beams and a pair of formwork beams are provided which are supported on the piers, whereto, inter alia, special support expedients on the latter are provided. After the traveling beam has advanced over the section to be concreted it serves the formwork beam, on which later the formwork is suspended, as a track. The formwork beam is then supported on the piers wherein it was already proposed to equip the traveling beam with an undercarriage of such a kind that the carrying out of a displacement laterally (that is at right-angles to its longitudinal axis) is possible to it, perhaps if the support structure of the bridge section consists of more than one continuous concrete longitudinal girder, as is the case, for example, in motorways with a carriageway for each direction of travel.

A concreting equipment for the discussed purpose has been made known in which the rear part of the traveling beam rests on a support trolley which allows the beam a lateral pivoting in order, during concreting of curved parts of the bridge, to allow the traveling beam, during advancement over the next section, i.e. to the next pier forward, to come closer to this forward pier.

To the known concreting equipment attaches the disadvantage that they pose particular requirements with respect to the support of the traveling beam, of which, in view of the multiplicity of the pier constructions carried out in practice and support-work cross-sections, account can only be taken that the concreting equipment is either suited to the profiles chosen on technical, economic and aesthetic grounds, in which case it can only be used for other profiles, if at all, only after troublesome adaptation, or that there are provided at the piers special, temporary or permanent supports. If, in so doing, as is necessary on grounds of economical carrying out of the beam advance, a concreting equipment is striven for in which the weight of the formwork and of the not yet fixed bridge section is borne by the traveling beam, then further problems arise in that this weight must be supported in part on the bridge section which has become load-carrying. This section has, however, considered in its cross-section, a completely non-unified form, so that the further problem arises of carrying out the support of the traveling beam in such a way that it allows of exclusion of an endangering of the bridge section due to high specific surface loadings for the most various cross-sections of the section in question by simple means.

For the removal of these difficulties, the invention proceeds from a traveling beam for the production of bridge sections and similar constructions between previously erected supports, namely piers, and is characterized by the combination of the following features:

(a) Two roller jacks, the effective height of which is adjustable even under load and which, suspended on the main girder, wherein the main girder can move along this, which are arranged for the supoprt of the main girder, can be advanced on each of these roller jacks in its longitudinal direction but also turned about the vertical axis passing through the roller jack, and wherein at least one of these roller jacks permits the main girder a transverse displacement also with reference to the main girder long axis, both in the loaded and also in the unloaded condition;

(b) Further characterized by a middle suport attached to the main girder, arranged between its ends and conveniently about in its middle with downwardly acting pressure arrangements which allow of the setting down of the main girder through support members on the constructional work, wherein the support members are releasable from the pressure arrangement;

(c) And finally characterized by a support jack which is movable on the main girder and fixable in a selectable position in the latter, also attached thereto to ensure to the main girder a support at the constructional work for the purpose of carrying out a longitudinal displacement and gives lateral guidance to the support members, and finally allows of securing the latter in this guidance in selectable settings, and which support jack, together with the support members then released from the pressure arrangement, is movable along the main girder.

The features named in points (a), (b) and (c) give the basic equipment of the traveling erection beam according to the invention. For adaptation to the various special cases of employment, there are provided the following additional equipments. Singly or in combination they are:

(A) A hinge in the erection beam which is arranged preferably in front of the middle support, possesses a vertical axis of rotation and therefore makes possible the horizontal pivoting of the part of the erection beam located in front of the hinge.

(B) A free cross-beam which can be moved on its own carriage on the already finished bridge sections and is improved in such a way that, in the event, it can be brought close to one of the roller jacks named under (a) or close to the support jack named under (c), so that, after alteration of the effective height, of at least one of the roller jacks, which previously took over the load acting on the roller or support jack and transferred to the bridge-supporting structure, or in the course of the advancement of the main girder is brought under the middle support, whereupon the main beam can be supported by means of the support members connected with the pressure device of the middle support and this in turn transfers the load then acting to the bridge-supporting structure.

(C) A coupling construction between the support members and the pressure arrangement in accordance with point (b) with which the effective height of the support members between the fully extended condition, in which the lower edge of the support members reaches about to the upper edge of the bridge pier and the fully withdrawn condition, in which the lower edge of the support members corresponds approximately to the lower edge of the main girder, can also be set in any desired intermediate positions.

(D) A rail track which is fitted on the upper side of the main girder and serves as a track for one or more cranes, which can traverse the main girder in the longitudinal direction and, on the one hand, can be used both for the erection of prefabricated parts of the bridge supporting structure and also for the transport of concrete, of reinforcing steel, etc., but on the other hand, can also be drawn upon for the erection of formworks, parts of the erection construction itself and the like.

Figure 11:
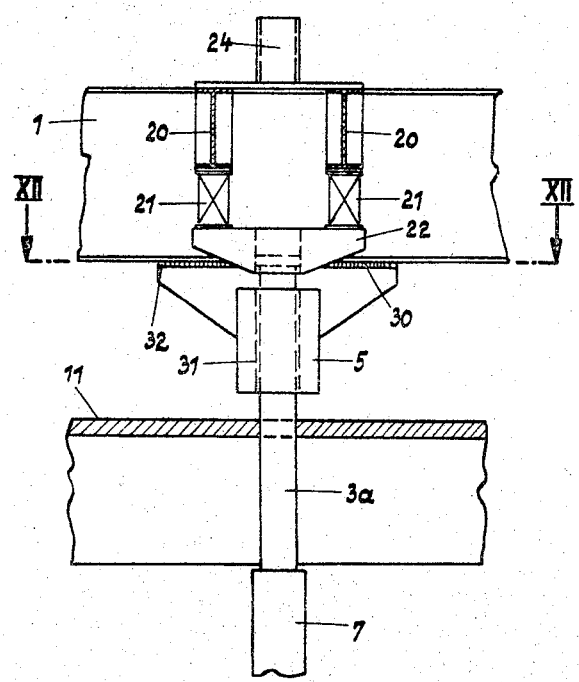
Figure 13:
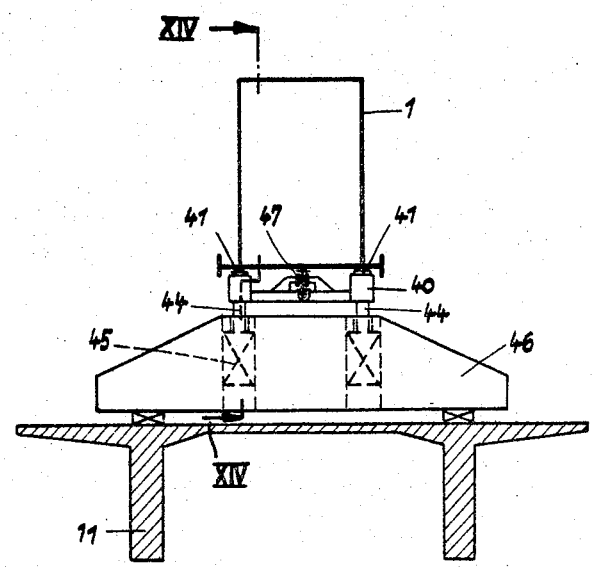
Figure 14:
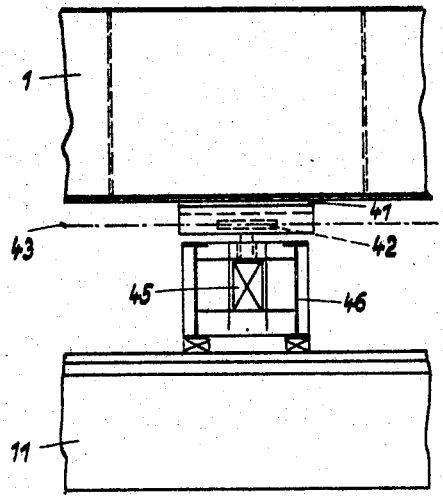
Figure 15:
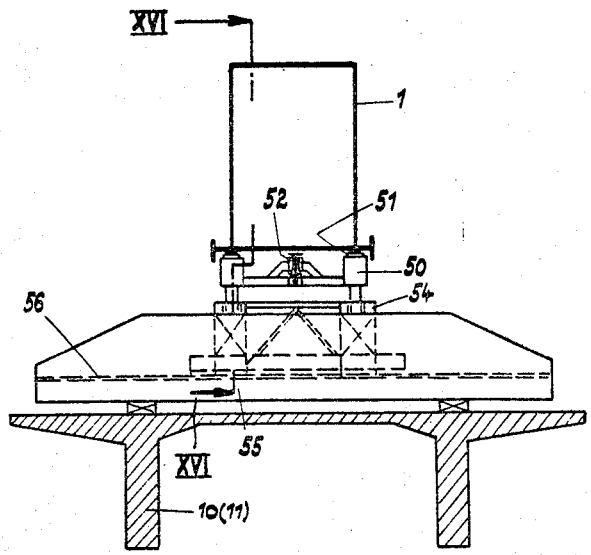
Figure 16:
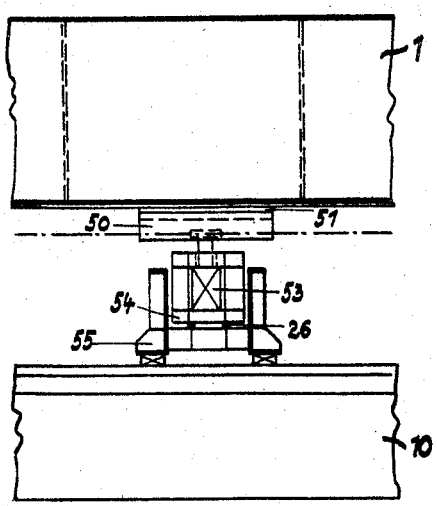
Figure 17:
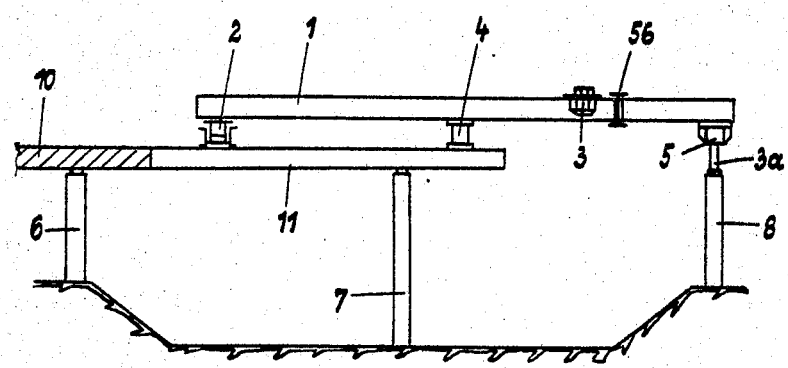
Figure 18:
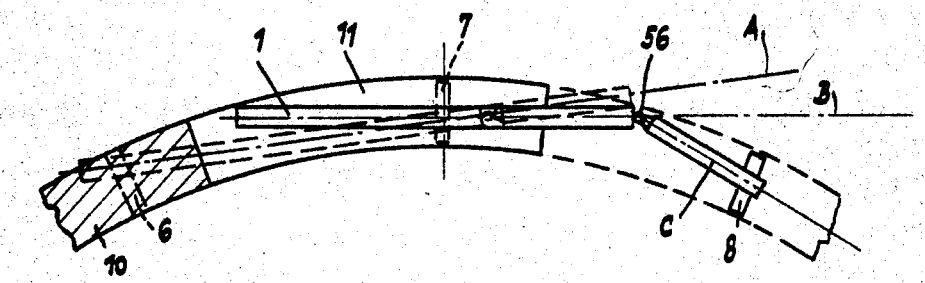
Figure 19:
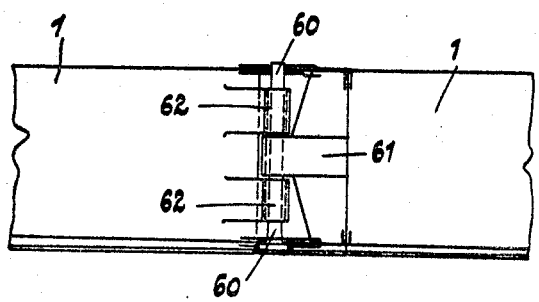

In the diagrammatic drawings, FIGURES 1–8 show the beam under consideration in an embodying example in various phases (concreting, uncasing, transference by several steps with travel to the next concreting position), FIGURES 17 and 18 a phase of the advancement operation by the use of the hinge in the main beam and FIGURES 9–16 various details of the theme and/or of its support and roller jacks, partially in sectional representations and at a greater scale than that of FIGURES 1–8, FIGURES 19 and 20 the hinge in the main girder, FIGURES 21–24 the insertion of the free cross-brace. They show in detail:

FIGURES 1–8 show in a diagrammatic side elevation the operations during setting up, concreting and advancement of a traveling beam in accordance with the invention for the production of two successive concreted bridge sections with the omission of the concreting formwork not essential for the invention and their suspension on the beam during the carrying out of the advancement operation without insertion of the free cross beam; FIGURE 9 the middle support by the supporting jack, seen in a longitudinal direction of the beam and FIGURE 10 a section along the line X—X of FIGURE 9; FIGURE 11 a side elevation of FIGURE 9 and FIGURE 12 a section along the line XII—XII of FIGURE 11; FIGURES 13 and 14 a roller jack without transverse track, in elevation in the direction of the long axis of the beam or in section along the line XIV—XIV of FIGURE 13, FIGURES 15 and 16 a roller jack with cross track, likewise seen in the direction of the long axis of the beam or in section along the line XVI—XVI of FIGURE 15, FIGURES 17 and 18 show each phase of the advancement operation in a strongly curved bridge-supporting structure making use of the hinge in the main girder, in which, after turning aside the part of the main girder lying in front of the hinge, the front end of the main girder is above the front pier together with the support jack there present. So that after alteration of the effective height of the roller jacks, the support jack, and consequently the main girder also, is laid on the pier. In this case FIGURE 17 shows the side elevation, FIGURE 18 is a plan view.

There is first described the general construction of the beam under consideration of its use in its simplest form without the additional arrangements, then the construction of the associated elements and thereafter the additional arrangements.

The actual beam or main girder 1 (FIGURES 1–8) has a roller jack 2, a middle support 3, a second roller jack 4 and a roller jack 5 called "front support jack." By 6, 7 and 8 are indicated the piers of the bridge-supporting structure; 10 is the already completed part of the bridge section and 11 the latest produced part thereof.

All supports and roller jacks 2, 3, 4 and 5 are so constituted that their lower support surface can be advanced to beam 1 which, with respect to roller jacks 2, 3 and 4, takes place conveniently by hydraulic means. The middle support 3 can be continuously connected with the beam 1 together with its pressure arrangement, but there is an embodiment also possible, according to which the middle support 3 can alter its position with relation to the longitudinal or main girder 1. The roller jacks 2, 4 and 5 are slidable along the main girder 1; "slidable" means in this case movability on the main girder 1.

The concreting formwork (not shown) is so constructed that it can pass to the main girder 1 and to the piers either by folding down or by lateral sideways movement of parts of the formwork halves.

The course of the individual moving or operating phases of the equipment represented in FIGURES 1–8 is, for the case of a bridge girder produced by means of formwork suspended on the main girder, as follows:

(1) CONCRETING POSITION

The equipment is set up in front on the middle support 3 and at the rear on the second roller jack at 4. If the load-distribution requires it, the laying down at the rear can also be carried out jointly on roller jacks 4 and 2. In this situation, all forces in the longitudinal direction are transmitted through the support jack 5 to the main girder, for which purpose the support jack is fixed to the main girder; so long as the advancement constructions in the roller jacks 2 and 4 are open. (If one of these advancement constructions is closed, then there consequently takes place a coupling of the pier 7 through the elements 3a, 5, 1 and 2 or 4 with the already completed bridge girder 10. In this way, forces can be diverted from pier 7 in the longitudinal direction of the bridge or can even, by means of the advancement construction exactly regulable with respect to their dynamic effect, of one of the roller jacks 2 or 4 the pier 7 can be optionally deformed in the longitudinal direction of the bridge, which can be used for balancing the longitudinal alteration of the bridge section 11, e.g. in consequence of prestressing, of shrinkage, of temperature alteration, etc.)

Concreting is at this position. After the setting of the concrete this is prestressed and at the same time the formwork is partially relieved of load. Then the whole equipment with the formwork attached thereto is further released so that the formwork is free.

According to the cross-sectional form of the bridge, the formwork is then set down on a working platform and a sliding platform or folding platform, which are likewise carried by the main girder (through vertical suspension beams) and are then underneath the bridge-supporting structure (not shown). By the operation of the sliding platform or folding platform, an opening is provided in the lower working platform through which, on the advancement of the main girder, the piers 7 and 8 can protrude. Thereupon the formwork is moved away laterally or folded down, after which the longitudinal advancement can begin. For special purposes, the formwork itself can also be carried out as a spatially rigid structure which, in itself, can be folded up or withdrawn as a whole or in parts laterally, whereby, in each case according to the formation of the formwork, the sliding or folding platforms, the lower working platform or in extreme case the suspension beam also, can be omitted.

(2) TRANSFERENCE OF THE ROLLER JACK 4

The roller jack 4 is relieved of load and lifted against the main girder 1, advanced to about the middle of the section and there set down (indicated by a broken line in FIGURE 1). Thereafter the roller jack 2 is relieved of load, lifted and set down close behind the roller jack 4. In this case, for a possible curve path, the basal frame of the roller jack 2, by means of the displacement parts still to be described, is displaced before setting down in the direction of the late turning at right-angles to the long axis of the constructional work.

(3) FIRST TRANSFERENCE OF THE ROLLER JACK 4

Next the roller jack 4 is further lifted, advanced close to the combination consisting of the middle support 3 and the support jack 5 and there set down. Roller jack 4 takes over the vertical load from the just mentioned combination 3 and 5, whereupon the support members of the middle support 3 which are shown by 3a in FIGURE 1 are lifted up. These support members are conveniently steel tubes of adequate buckling resistance. One of the roller jacks now forms the fixed point also for forces in the longitudinal direction. The equipment now rests on the roller jacks 2 and 4.

(4) FIRST TRANSFERENCE OF THE SUPPORT JACK 5

This is now advanced against the end of the projecting part of the last finished section 11 and there lowered and placed under load, whereby the roller jack 4 is relieved of load.

(5) SECOND TRANSFERENCE OF THE ROLLER JACK 4

This is lifted, the equipment lies at the moment on the roller jack 2 and the support jack 5. The roller jack 4 is now advanced and set down close to the support jack 5. Thereupon the load from the support jack 5 is transferred to the roller jack 4 so that the equipment again lies on the roller jacks 2 and 4. The support jack 5 now stands again on the bridge by its own weight.

(6) FIRST ADVANCEMENT STEP (FIGURE 6 SHOWS THE FINAL POSITION OF THIS STEP)

The equipment, i.e. the main girder 1, is advanced so far that the total center of gravity of the main girder, and in any event the further loads thereon dependent, comes close to the roller jack 4. By this means the roller jack 2 is still further relieved of load. During the advancement operation, in the case of curved movement, the equipment is still further swung over the roller jack 2 so that the suspension beams for the lower working platform do not collide with the bridge-supporting structure.

The longitudinal advancement is continued until the main girder 1 is, by its leading end, over the next pier 8. Now in the case of the curved travel the main girder is turned so far over the roller jack 4 that the axis of the equipment lies over the middle of the next pier.

These pivoting situations can, in principle, be carried out in such a way that the turning takes place over the roller jack 2, during which the roller jack 4 then must have the cross movement track (which will be more exactly described). It is also possible (and for the production of strongly curved bridges even expedient), to equip both roller jacks 2 and 4 with cross movement tracks, by which means the least deviation of the suspension beams (which hold the formwork) from the profile of the bridge is achieved. This variant embodiment is recommended for the production of bridges with two juxtaposed supporting structures and large bridge curvatures, because, in this case, the suspension beams must engage between both supporting structures, which, by non-adherence to this recommendation, would make necessary a broad, i.e. undesired, gap between the two supporting structures, in so far as the main girder is not provided, as additional equipment, with a hinge for pivoting the forward part of the main girder, by which means a similar effect is obtained.

In the course of the longitudinal advancement, the pressure arrangement of the middle support 3 again comes over the support jack 5. Until then, this stands on the bridge. At this stage, the support jack 5 is fixed to the main girder and comes into the free section on further advancement. There the support members 3a (conveniently tubular) can again be inserted in the guides of the support jack and be secured there load-transferring also.

(7) SECOND TRANSFERENCE OF THE SUPPORT JACK 5

This is advanced on the main girder 1 until over the next pier 8 and there set down on the support members 3a, which are firmly connected to the support jack 5. The exact adjustment of the vertical position in this case takes place with the lifting cylinders of the roller jacks 2 and 4. Thereupon the combination of 5 and 3a is ready for taking up the load and by further adjustment the lifting cylinder of the roller jacks 2 and 4 is placed under load.

(8) SECOND ADVANCEMENT STEP

Figure 8:
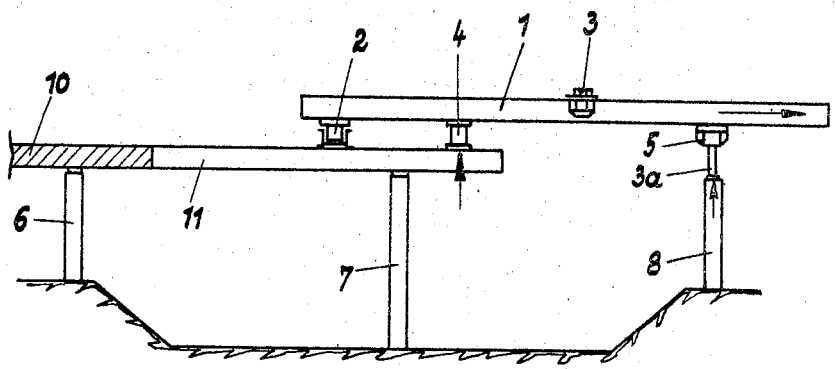

In FIGURE 8 is shown an intermediate stage thereof. The equipment is further advanced, during which the roller jack 2 is relieved of load and, suspended from the main girder 1, is brought forward. At the end of this advancement step, the initial condition (concreting position) for the next section is reached.

The pressure cylinders of the pressure arrangement of the middle support 3, which are located on the main girder, are now over the combination of 5 and 3. They are now actuated and take over the vertical loads acting on the support members 3a. The vertical fixing between the support members 3a and the support jack 5 can now be released. The support jack 5 serves further as a guide for the support members 3a and takes over the reactions from the horizontal loads in the longitudinal and transverse direction, as they result, for example, from an inclined course of the supporting structure or by the incidence of wind. The formwork can again be brought into the initial situation. Whereupon the formwork is again suspended and set up. By this means the equipment is ready for the production of the next bridge section.

The preceding description relates to one of the possible advancement operations of the erection construction without employment of additional arrangements. These then allow of a more extensive adjustment of the advancement operation to particular spatial relations or to the loading possibilities given by the bridge construction itself.

Figure 20:
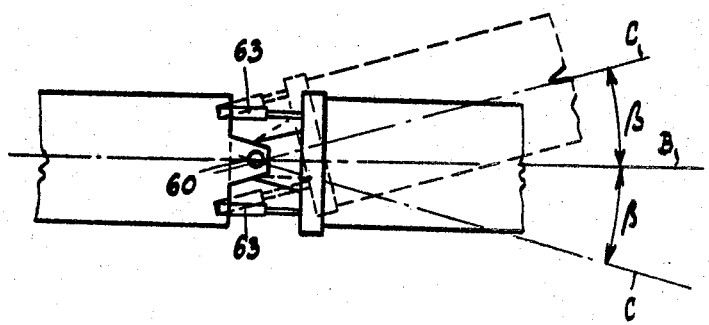

The hinge 56 in the main girder 1 makes possible, even in bridges with strong horizontal curvature, lateral pivoting on the roller jack 2 and consequently also of keeping the lateral movement of the suspension beams low, which is particularly of importance in two adjacent bridge girders. Moreover by this means to the same extent the eccentric load produced by the load on the laterally pivoted roller jack 2 in relation to the bridge girders 10 and 11 is reduced. The torsion angle on the roller jacks 2 and 4 is likewise reduced. In FIGURE 18 are marked: by A the axis of the whole beam during concreting of the section 11; by B the beam axis after advancement and lateral swinging of the beam and by C the axis of the out swung, foremost part of the beam and it is obvious that it is possible, with this arrangement, to build bridges which combine great curvature with great distance apart of piers. These axes, which define the pivoting angle $\beta$ are also represented in FIGURE 20.

The free cross-beam 57, FIGURES 21–24, allows of matching the advancement operation to the loadability of the construction. If the bridge-supporting structure is particularly susceptible to loadings in the inner area between piers 6 and 7, then the bridging forward of the roller jack 2, for example, can take place so that, in each case, the free cross-beam 57, i.e. not fixed to the girder 1, is moved behind the roller jack 2 and then by lowering the roller jack 2 the main girder 1, as shown in FIGURES 21 and 22, is supported on the cross-beam 57. Thereupon the roller jack 2 suspended on the main girder 1 can be brought forward and in the new position, by the moving out of the roller jack 2, again take over the support of the main girder 1. Thereupon the main girder 1 itself can be advanced by the distance by which the roller jack 2 was advanced. Since, by this means, the centre of gravity of the whole erection construction travels forward at the same time, and the front bearing, e.g. on the roller jack 4, is left unchanged, the loading of the roller jack 2 is thereby reduced by which also the bending moments and transverse forces in the bridge girder 10 or 11 are reduced. But the cross-beam 57 can also be employed in the region of the forward support at pier 7, particularly when the additional transverse forces of bending moments should be kept small. There are then in this area three loadable construction members present, namely the roller jack 4, the support jack 5 and the cross-beam 57. If now at the beginning of the advancement operation, for example, first the main girder 1 is advanced so far that the support members 3a come to rest above the cross-beam 57 and the coupling construction likewise forming an additional equipment between the support members 3a and the pressure arrangement 3 also makes possible a transfer of load in this position, two of the points of bearing, namely the roller jack 4 and the cross-beam 57, are regulable in their loading by means of the regulable lifting arrangements (conveniently hydraulic arrangements) of the roller jack 4 and the pressure arrangement 3. By this means can be regulated on the one hand which part of the fraction of the weight of the total erection construction falling on the pier 7 in this position is transferred before or behind the pier 7 on the bridge girder 11 wherewith the distribution of the transverse forces and the bending moments can be adjusted to the loadability of the bridge girder 11. Thereby the most diverse variations are naturally possible both in the situation of the elements 4, 5 and 57 and also in the load distribution.

The collaboration of the main girder 1 with the cross-beam 57 is, in the situation of these parts shown in FIGURE 22, facilitated by a support foot 65 fixed to the main girder 1, on the under-side of which the girder 1 can be supported on the cross-beam without there being a constructional connection between these parts.

There follows a description of the constructional design of the roller jacks, the middle supports and of the support jacks by means of FIGURES 9–16 and also of the hinge and of the cross-beam by means of FIGURES 19–24, wherein it is assumed that it concerns the concreting of a bridge roadway which rests on piers of rectangular cross-section, and deals with a bridge girder possessing a T-beam section. In FIGURES 9–16 the actual formwork and its suspension arrangement, which, connected with the continuous, traveling main girder 1, is omitted because it can be of a known kind and is of no interest in the present connection. It is to be understood that the constructions described in what follows have only the character of examples.

(9) THE MIDDLE SUPPORT 3 ON THE MAIN GIRDER 1

In the concreting position of the equipment, the middle support 3 is located above the pier 7 of the section to be concreted. The middle support is provided with an hydraulic lifting arrangement. If it relates, as shown, to a middle support 3 rigidly connected with the main girder, then the main girder at this point is fitted with two continuous cantilever beams 20, to the under-side of each of which two lifting cylinders 21 are fixed, thus in sum four lifting cylinders are present. In each case, two of these lifting cylinders lie in the longitudinal direction of the main girder behind one another and are coupled together with the intermediate piece 22. This intermediate piece 22 bears for its part on a support member 3a which is here regarded as embodied as a tube and which is located in the middle between the two lifting cylinders 21. In sum there are thus two of such support tubes which are arranged symmetrically in the long axis of the bridge at the side of the main girder 1 and on which two lifting cylinders act in each case.

The cantilever beams 20 are so formed that the lifting cylinders 21 together with the intermediate piece 22 and support tube 3a can lie optionally not only on both sides outside, but also inside, the main girder 1. The arrangement outside the main girder is used with broad piers, the arrangement inside the main girder on the contrary with piers of less breadth or with round piers.

The support jack 5 used together with the middle support 3 serves for guiding the support tubes 3a and for taking up the reactions from the horizontal loads in a longitudinal and transverse direction.

The support tubes 3a are of different lengths according to the kind of bridge construction. In all bridges which have special bearings 23 between the bridge-supporting structure 11 and the pier 7, the present equipment is set up above the support tubes directly on the top edge of the pier. On the other hand, in bridges in which a rigid connection of the pier with the bridge-supporting structure exists, bearing can take place about at the level of the upper edge of the latter supporting structure.

In connection with the advancement operation, it may be necessary, in the first kind of bearing (in which the support tubes 3a pass through the top of the bridge-supporting structure 11) to raise the support tubes somewhat to the level of the under-side of the main girder 1. For this purpose, by opening the fixings in the intermediate pieces 22, they can be drawn through the latter, or the intermediate pieces can be displaced in the unloaded condition so that passage for the support tubes 3a is free. In the raised condition, the support tubes are held in their own guides 24 arranged above the cantilever beams.

FIGURE 10 shows in plan the bearing (represented in section) of the support tubes 3a on the pier 7. In FIGURE 11 a side elevation of FIGURE 9 is shown also.

Figure 23:
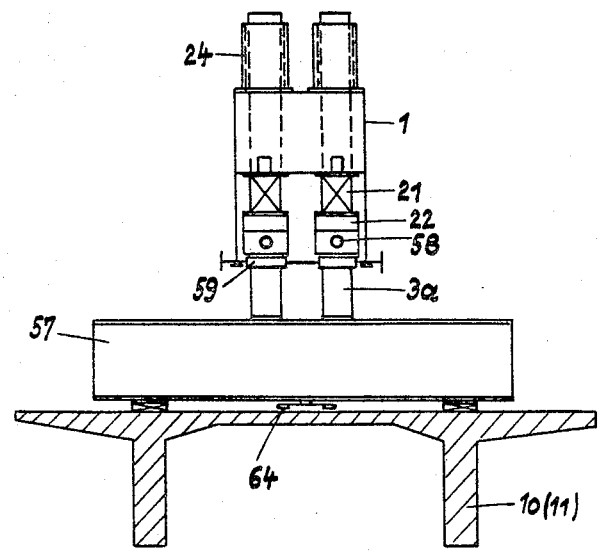
Figure 24:
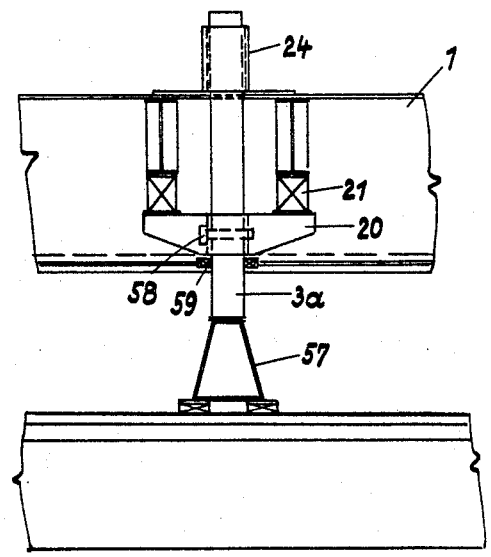

In connection with the employment of the cross-beam 57 is also the use of the additional coupling construction between the support members 3a and the pressure arrangement 3. It allows of the connection positively of the support members 3a at any desired level with the intermediate pieces 22 and consists, in the simplest embodiment, of a pin 58 which is inserted through suitable holes in the intermediate piece 22 or in the wall of the support member 3a possessing the preferred tubular cross-section (circular or rectangular or square section). By this means, the partially raised support members 3a can be used for supporting the main girder 1 on the cross-beam 57 as FIGURES 23 and 24 show, whereby the level of the main girder 1 relative to the cross-beam 57 can be regulated by the lift of the hydraulic cylinder 21. If, in the support member 3a, a series of holes is arranged, the distance apart of which is smaller than or at most equal to the lift of the hydraulic cylinder 21, then the support member 3a, by means of the lifting movement of the hydraulic cylinder 21, can be lifted or lowered over the whole length of the support member 3a, if about at the end of the lifting movement of the cylinders 21, the support member 3a is temporarily fixed by the main girder 1, whereupon the pin 58 can be withdrawn, the intermediate piece 22 is again moved downwards, whereupon the pin 58 is again inserted both through holes in the intermediate piece 22 as also in the support member 3a, whereupon the fixing of the support member 3a by the main girder 1 is released so that the operation can be repeated. By this means, special arrangements for the movement of the support members 3a are unnecessary. Since, for example, by the employment by means of the cross-beam through the support members 3a horizontal loads must also be transferred, the support members 3a are also kept, additionally to the upper guide 24, in the lower guides 59.

(10) THE SUPPORT JACK 5

This possesses a torsion-resistant basal frame, the breadth of which is so great that, in the set-down condition, it can always be supported on the area of the bridge-supporting structure, also load bearing for local loads.

To these basal frames two roller paths 30 are fitted, on which the main girder 1 rolls during longitudinal advancement.

Figure 12:
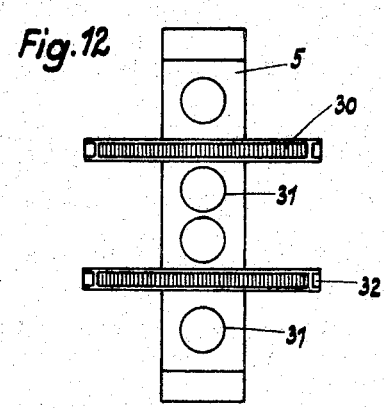

These roller paths can either be connected fixed to the basal frame, as shown in FIGURES 11 and 12, or can be horizontally pivotable with respect thereto, so that the axis of the main girder 1 during longitudinal advancement, seen in plan, can also lie obliquely to the axis of the support jack 5, and consequently can correspond to the geometrical requirements of the longitudinal advancement with the hinge 56 turned away as seen in FIGURE 18.

In the combination 3 and 5, the support jack 5 serves as guide construction for the support tubes 3a. Of the four vertical guides 31 present in the basal frame for the support tubes 3a (i.e. generally for the support members) only two are always used simultaneously, according to whether the support tubes 3a lie inside or outside the main girder, which, as already observed, depends on the profile of the pier 7.

For transfer of the reactions from the horizontal loadings to the main girder, rigid fixings 32 are present at the four ends of the roller paths, which according to the advancement position are either open or in engagement. In the middle of the basal frame, rollers 33 are fitted with which the support jack 5 on a middle track 34 of the main girder 1 can be advanced along the latter.

(11) THE ROLLER JACK 4

FIGURE 13 shows the roller jack seen in the direction of the main girder, FIGURE 14 a side elevation thereof. The roller jack has at the top a travelling stool 40 with two roller conveyors 41 on which the main girder 1 is mobile. This travelling stool is so formed that it allows both of rotations about the vertical axis and also pivotings about the horizontal axis in the transverse direction; when deflecting the main girder from the horizontal upwards or downwards, the latter is essential.

In this travelling stool is included an advancement construction 42. It consists of at least one hydraulic cylinder, which, by means of a clamping head, engages with a wire 43 stretched on the under-side of the main girder and connected thereto and allows of a stepwise forward movement of the main girder. This clamping head, which can also be replaced by another advancing arrangement, is not represented.

The traveling stool 40 also carries a stopping device which, on larger gradients of the bridge or inclinations of the main girder, prevents a spontaneous movement of the equipment if the clamping head is loosened (likewise not represented). Advancement construction and stopping device can also be combined in one unit.

The travelling stool 40 sits on two vertically directed support pivots 44 on two lifting cylinders 45. These lifting cylinders 45 are fixed in the basal frame of the roller jack 4. The traveling stool can thus be raised and lowered relative to the basal frame. The breadth of the basal frame is, on the contrary, so great that in the set-off position it can still bear on the load carrying area of the bridge-supporting structure even for local leads.

The traveling stool also possesses rollers 47 on which the roller jack 4 can travel in the longitudinal direction on the middle track.

(12) THE ROLLER JACK 2

FIGURE 15 shows this seen in the direction of the main supporting structure, FIGURE 16 a side elevation thereof. The roller jack 2 has a travelling stool 50 with the same construction as described in roller jack 4; that is with roller conveyors 51 and rollers 52 and can also be equipped with a forwarding or stopping construction. This travelling stool rests, just as in roller jack 4, on two lifting cylinders 53. This lifting construction is included in an intermediate frame 54 which for its part is laterally displaceable in the basal frame 55 by means of a slideway 56. The basal frame 55 is, on the one hand, at least so broad that in the off-set position it can still be supported in the load carrying area of the bridge-supporting structure even for local loads, on the other hand, account must also be taken of the lateral displacement of the intermediate frame 54 during pivoting of the main girder 1. Thereby the basal frame 55 can be staggered in the direction of the lateral displacement (outside curve).

(13) THE HINGE 56

The hinge 56 is inserted in the main girder 1 and allows of the pivoting of the forward section of the main girder 1 about a vertical axis during the advancement operation in bridges with strong curvature. For this purpose, it possesses two pivot pins 60 for taking up the vertical bending moments acting in the front section of the main girder 1 or torsional moments about the longitudinal axis of the main girder 1 and also cantilevers 61 and 62 for taking up the vertical transverse forces. Horizontal pivoting is effected by means of two laterally arranged hydraulic cylinders, which also take up the horizontal bending moments of the main girder 1. The middle rail, which serves for the transport of the roller jacks 2 and 4 and of the support jack 5 is, just as the runway rails, on which the main girder runs on the roller conveyors, pivotable in order not to prevent the movement of the hinge.

(14) THE CROSS-BEAM 57

The cross-beam 57 consists of a section of sufficient depth, bend-resistant both in the vertical and also in the horizontal direction, in order to be able, in the loaded condition, so as to bear on the area, load carrying for local loads, of the bridge-supporting structure. For transport between the individual places of employment, it possesses a bogie 64 arranged in the middle of the cross-beam 57.

The traveling beam in accordance with the invention is distinguished in particular in that its possibility of employment is to a great extent independent of the respective distance apart of the piers, whereby, within a length to be concreted, unequal distances apart of piers are also permissible; in addition in that its advancement can also then take place very simply, if curved bridge sections are to be produced.

Due to the possibility of using the support members of the middle support in various guides of the roller jack 4, all usual pier cross-sections can be used as supports without the necessity of special additional measures.

These advantages are connected with good adaptability to the cross-sections of the bridge-supporting structures met with in practice, wherein the considerable breadth of the roller jacks 2, 4 and of the support jack 5 guarantees extensive adaptability to the requirements of the individual case.

In the embodying example described above, the pressure arrangement of the midde support is fixed to the main girder 1. By this means, through the support tubes 3a, the vertical loads from the net weight of the equipment, of the formwork and of the concrete load are conducted directly to the main girder 1. Consequently, the support jack 5 has only to take over the horizontal loads. In the case of small concrete loads, it can be economical to transfer the vertical loads even in the concreting situation directly to the support jack, for which purpose the lifting hydraulic must be incorporated in the support jack 5.

The embodiment of the invention described by means of the drawings makes possible, thanks to the ingenuous arrangement and construction of the roller jacks and other support organs, to move the whole equipment in the same way as on piers on the crown of the adjacent road lengths (even if this has not been finally consolidated) in the longitudinal and transverse direction by steps by its own means. The equipment is thus movable in all directions by its own means at relatively great speed. It can therefore also be used reasonably as transfer equipment for bridges in prefabricated construction, wherein the main girder can also serve as a support construction for its own trolleys or cranes, for which purpose additional rails 64, as given in FIGURES 13 and 15, can be arranged on the main girder 1.

I claim:

1. A traveling-beam assembly for the construction of bridge sections and the like spanning previously erected piers and successively aligned with one another and a support portion, said arrangement comprising:

an elongated traveling beam;

first and second vertically adjustable roller jacks carried by said beam and individually shiftable relatively to one another, to said beam and along said surface, at least one of said roller jacks enabling pivotal movement of said beam about a vertical axis;

an intermediate support mounted upon said beam between the ends thereof and provided with at least one downwardly acting releasable pressure member lowerable to support said beam; and a further jack ahead of said first and second roller jacks shiftable along said beam and engageable with said member upon its release by said intermediate support for supporting said beam, said further jack being shiftable relatively to said beam whereby, with said beam resting upon one of said first and second jacks and upon said further jack, the other of said first and second jacks is relieved for advance along said beam in the direction of said further jack and, upon lowering of said member from said intermediate support, said further jack is relieved to enable its advance along said beam, said beam being longitudinally shiftable upon relief of said further jack while supported by said first and second jacks.

2. A traveling-beam assembly as defined in claim 1, further comprising means for rigidly securing said intermediate support to said beam.

3. A traveling-beam assembly as defined in claim 1 wherein said further jack is provided with a plurality of guides spaced apart transversely of said beam for selectively receiving said support member, thereby adjustably positioning the beam relatively to said support member.

4. A traveling-beam assembly as defined in claim 3 wherein a pair of horizontally spaced vertical support members are releasably engageable by said intermediate support and are respectively receivable in said guides for adjustably spaced positioning of said members.

5. A traveling-beam assembly as defined in claim 1 wherein said intermediate support is provided with a pressure arrangement engageable with said pressure member upon vertical alignment of said intermediate support and said further jack.

6. A traveling-beam assembly as defined in claim 1, further comprising means including a pin adapted to transfix said pressure member for releasably locking same to said further jack.

7. A traveling-beam assembly as defined in claim 1 wherein said beam comprises a pair of beam portions in end-to-end relationship, said assembly further comprising hinge means enabling lateral pivoting of said portions relatively to one another.

8. A traveling-beam assembly as defined in claim 1, further comprising a crossbeam shiftable along said surface and supporting the first-mentioned beam.

9. A traveling-beam assembly as defined in claim 8, further comprising a foot depending from said first beam and engaging said crossbeam, said crossbeam being provided with roller carriages resting upon said surface.

10. A traveling-beam assembly as defined in claim 1, further comprising means displaceable along said beam for suspending construction equipment therefrom.

References Cited

UNITED STATES PATENTS

| | | | |
|---|---|---|---|
| 2,963,764 | 12/1960 | Finsterwalder | 52—223 |
| 3,027,633 | 4/1962 | Murphy | 14—1 |
| 3,299,191 | 1/1967 | Mantscheff | 264—34 |

HARVEY C. HORNSBY, Primary Examiner

U.S. Cl. X.R.

14—1; 212—74, 144; 254—84; 264—34